United States Patent
Kim

(10) Patent No.: US 7,135,971 B2
(45) Date of Patent: Nov. 14, 2006

(54) ANTI-THEFT AND SECURITY SYSTEM FOR COMPUTERS

(76) Inventor: Walter Taehwan Kim, 1885 S. Oswego St., Aurora, CO (US) 80012

( * ) Notice: Subject to any disclaimer, the term of this patent is extended or adjusted under 35 U.S.C. 154(b) by 499 days.

(21) Appl. No.: 10/755,484

(22) Filed: Jan. 12, 2004

(65) Prior Publication Data

US 2005/0073423 A1  Apr. 7, 2005

Related U.S. Application Data

(60) Provisional application No. 60/511,472, filed on Oct. 15, 2003, provisional application No. 60/507,306, filed on Sep. 30, 2003, provisional application No. 60/504,719, filed on Sep. 22, 2003.

(51) Int. Cl.
 G08B 1/08 (2006.01)
 G08B 13/12 (2006.01)
 G08B 13/14 (2006.01)
 G08B 21/00 (2006.01)
 G01P 15/00 (2006.01)

(52) U.S. Cl. ............... 340/568.1; 340/539.1; 340/539.15; 340/568.2; 340/568.3; 340/572.1; 340/572.3; 340/572.9; 340/686.1; 340/686.4; 702/141

(58) Field of Classification Search ............. 340/539.1, 340/539.15, 568.1, 568.2, 568.3, 572.1, 572.3, 340/572.9, 686.1, 686.4; 702/141
See application file for complete search history.

(56) References Cited

U.S. PATENT DOCUMENTS

| | | | | |
|---|---|---|---|---|
| 5,757,271 A * | 5/1998 | Andrews | ................. | 340/568.1 |
| 6,137,409 A * | 10/2000 | Stephens | ................. | 340/568.1 |
| 6,294,995 B1 * | 9/2001 | Patterson | .................... | 340/571 |
| 6,462,668 B1 * | 10/2002 | Foseide | ...................... | 340/687 |
| 6,954,147 B1 * | 10/2005 | Cromer et al. | ........... | 340/568.1 |
| 7,028,513 B1 * | 4/2006 | Avganim | ....................... | 70/18 |

* cited by examiner

Primary Examiner—Daniel Wu
Assistant Examiner—Lam Pham

(57) ABSTRACT

A system is disclosed for preventing an unauthorized person from taking or using a portable computer. The anti-theft/security system includes a USB device having a motion sensor attached to a casing of a portable computer. The USB device is connected to a port of the portable computer using a connector. The anti-theft/security system also includes an alarm sub-system to cause an audible sound to be generated, which is triggered based on a signal generated by the motion sensor located inside the USB device.

17 Claims, 6 Drawing Sheets

ANTI-THEFT AND SECURITY SYSTEM FOR COMPUTERS

CROSS-REFERENCE TO RELATED APPLICATION

This application claims the benefit of priority to U.S. Provisional Patent Application Ser. No. 60/511,472, filed Oct. 15, 2003. This application also claims priority from U.S. Provisional Patent Application Ser. No. 60/504,719, filed Sep. 22, 2003. This application further claims priority from U.S. Provisional Patent Application Ser. No. 60/507,306, filed Sep. 30, 2003. The entire disclosure of each of U.S. Provisional Application Nos. 60/511,472, 60/504,719, 60/507,306 is incorporated herein by reference.

BACKGROUND

1. Field

Embodiments relate to anti-theft and/or security system for electronic devices, such as portable and non-portable computers.

2. Background

Various anti-theft devices have been proposed to prevent the theft of electronic devices, such as portable and non-portable computers. For example, a combination of a cable and a lock may be used to prevent theft of a portable computer by anchoring the portable computer to a structure that cannot be easily moved. As another example, a portable anti-theft device containing a motion sensor may be used to prevent theft of a portable computer by securely attaching the anti-theft device to the portable computer using a combination of a cable and a lock. When the anti-theft device is activated, the motion sensor incorporated within the portable anti-theft device triggers an audible alarm signal in response to movement of the portable computer to which the anti-theft device is attached.

There are a number of disadvantages associated with the above-described devices. For one thing, each time a user needs to set up the portable computer at another location, the user must manually attach the above-described devices to the portable computer using a cumbersome cable and lock combination. One of the major benefits of having a portable computer is that it can be easily carried to many locations and it can be easily set up at the selected locations. Therefore, extra efforts required in manually attaching such anti-theft devices to a portable computer using a cable and lock combination decrease the usefulness of the portable computer and/or the desirability of using such anti-theft devices.

SUMMARY

In accordance with one embodiment of the present invention, a system is described for preventing an unauthorized person from taking or using a portable computer. The anti-theft/security system includes a USB device having a motion sensor attached to a casing of a portable computer. The USB device is connected to a port of the portable computer using a connector. The anti-theft/security system also includes an alarm sub-system to cause an audible sound to be generated, which is triggered based on a signal generated by the motion sensor located inside the USB device.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, specific details are set forth in order to provide a thorough understanding of the present invention. However, it will be apparent to one skilled in the art that the present invention may be practiced without these specific details. In other instances, well-known hardware and software components, structures and techniques have not been shown in detail in order to avoid obscuring the present invention.

Figure 1:
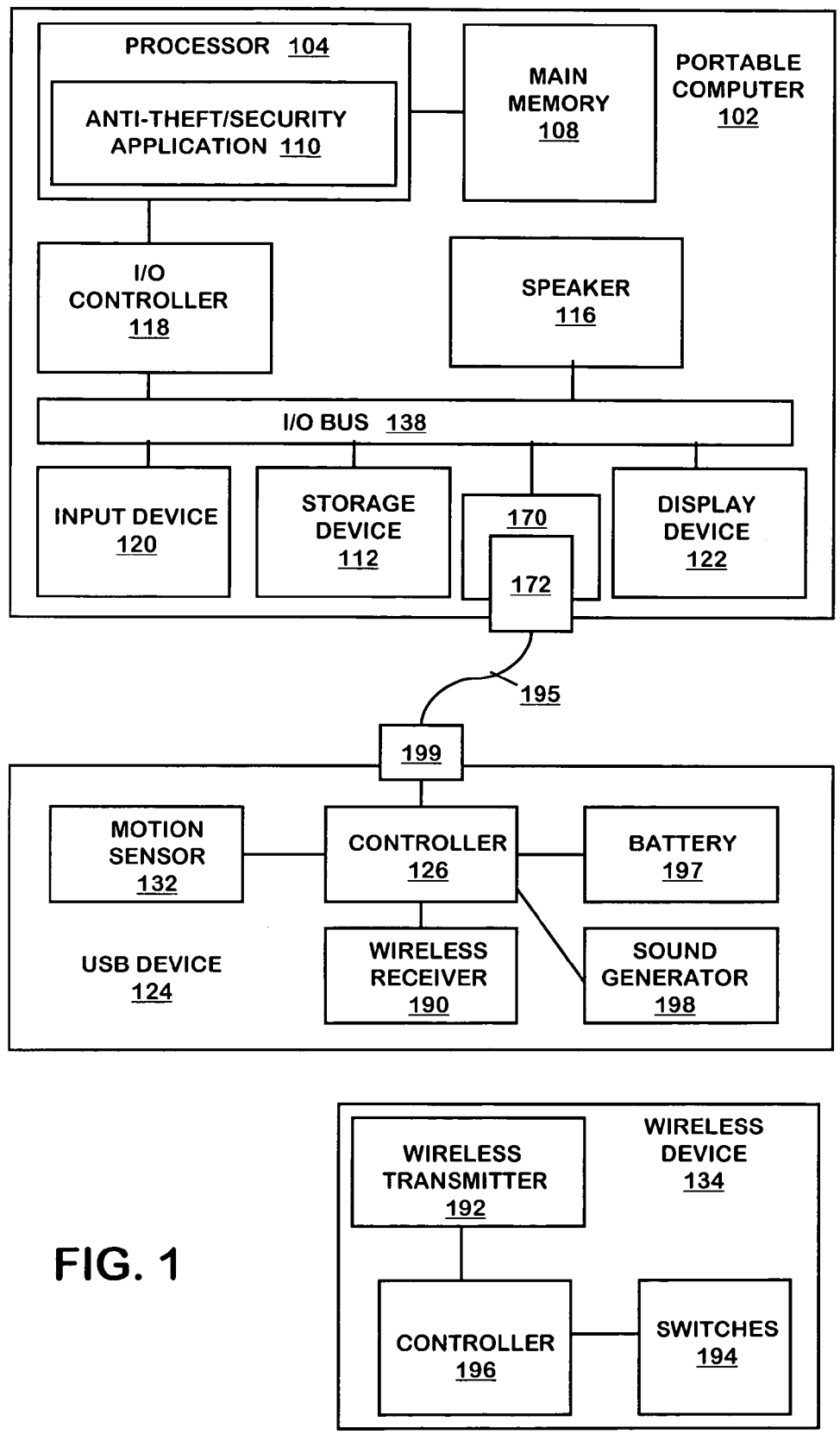
FIG. 1 shows a block diagram of an anti-theft/security system for a computer according to one embodiment of the invention.

FIG. 1 is a block diagram of an anti-theft/security system for a portable computer according to one embodiment of the invention. Illustrated in FIG. 1 is an example of a portable computer 102 to which the anti-theft/security system according to one embodiment of the invention may be implemented. In one embodiment the anti-theft/security system is used to prevent unauthorized taking and/or use of the portable computer 102. It should be noted that the anti-theft/security system may also be used with non-portable computers. The portable computer 102 includes a processor 104 coupled to a main memory 108 and a number of I/O devices coupled to an I/O controller 118 via an I/O bus 118. The I/O devices may include input devices, such as a keyboard and a pointing device 120, a storage device 112 (e.g., hard disk drive), a display device 122 and a speaker 116.

In one embodiment, the anti-theft/security system uses a device 124 coupled to a USB (Universal Serial Bus) port of a portable computer 102 to detect a possible unauthorized taking and/or use of the portable computer. In one embodiment, the USB device is capable being removably coupled to an external USB port of a computer. In the illustrated embodiment, the USB device includes a wireless receiver 190 capable of receiving wireless signals. In one embodiment, the USB device 124 includes an enclosure that contains a controller 126 and a connector 172 to connect the USB device 124 to a USB (Universal Serial Bus) port 170 of the computer 102. In use, the controller 126, located within the enclosure, may communicate with the portable computer 102 to enable and disable an alarm sub-system implemented by the computer, based on a wireless signal received by the wireless receiver 190. In one embodiment, the connector 172 of the USB device 124 is fixedly and directly connected to the enclosure of the USB device. In one embodiment, when the USB device 124 is coupled to the computer, the enclosure of the USB device is disposed external to the computer.

In one embodiment, the anti-theft/security system is configured to trigger an audible alarm based on a signal generated within the USB device 124. In one embodiment, the USB device 124 includes a motion sensor 132 to enable detection of the movement thereof. The motion sensor 132 may comprise a mercury switch, a piezoresistive switch, an accelerometer, a gyroscope, an angle sensor or any other mechanism sensitive to displacement motion and/or angular motion. The motion sensor 132 is electronically, coupled to the controller 126. When the USB device 124 connected to the portable computer 102 is moved by a person, the controller 126 in conjunction with the motion sensor 132 will generate a motion signal indicating that the USB device 124 is being moved from a stationary position.

Figure 6A:
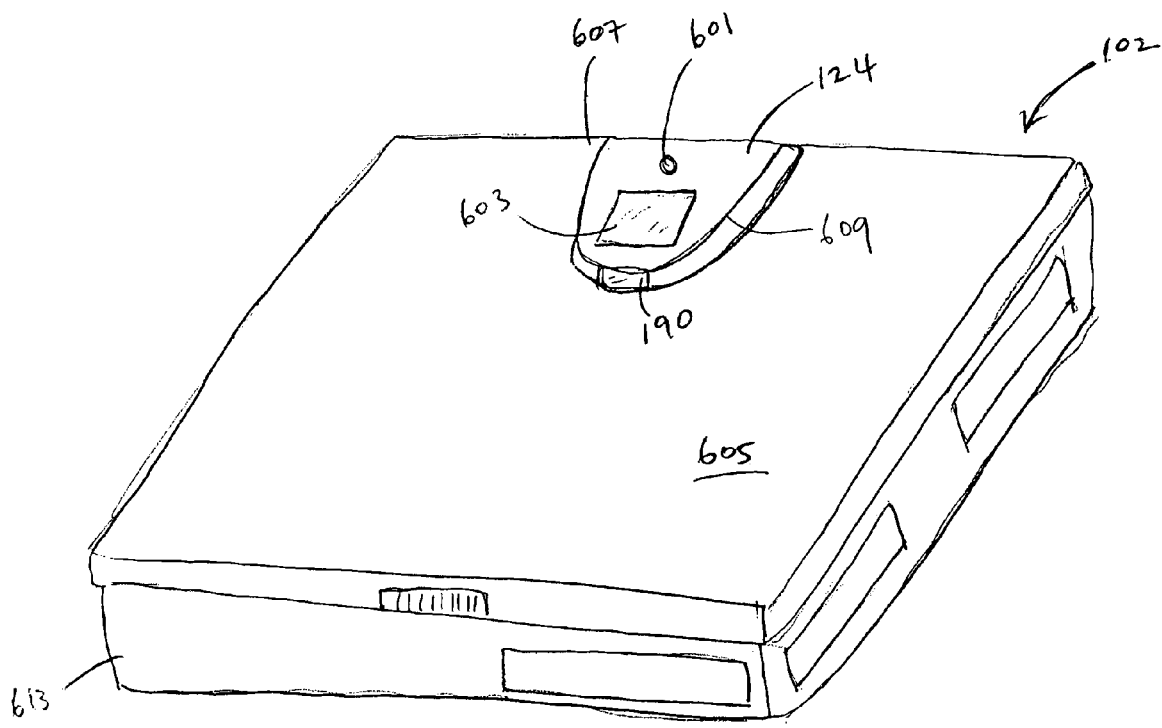
FIG. 6A shows a diagrammatic perspective view of an anti-theft device attached to a top cover of a portable computer according to one embodiment of the invention.

FIG. 6A shows a diagrammatic perspective view of an anti-theft device (USB device 124) attached to a top cover of a portable computer according to one embodiment of the invention. Typically, a portable computer 102 (e.g., notebook computer) includes a top cover 605 pivotably connected to a base unit 613 via hinge mechanisms. To use the computer 102, the top cover 605 is pivoted upward and tilted backward, relative to the base unit 613, to allow visual access to the display screen and physical access to the keyboard and on-off switch of the computer. In one embodiment, the motion sensor 132 contained in the USB device 124 is sensitive to and is able to detect changes in tilting angle of the top cover 605 of the portable computer 102. In this regard, because the USB device 124 attached to the top cover 605, the USB device 124 is able to detect when someone is trying to open the top cover 605 of the portable computer based on signals generated by the motion sensor 132 located inside the USB device 124. Because an audible alarm will be generated as soon as someone tries to open the top cover of the portable computer while the anti-theft/security system is enabled, this arrangement prevents or discourages others from opening the top cover 605 and/or turning off the computer 102 while the portable computer is left unattended. In one embodiment, adhesive material is used to non-removably or permanently attach the bottom surface of the enclosure 609 of the USB device 124 to an upper surface 607 of the top cover 605 of the portable computer 102. Other suitable mounting methods may be used to fixedly and/or permanently attach the USB device 124 to any portion of the casing of the portable computer, including use of fasteners or mounting structures. In one embodiment, the USB device 124 is attached to the casing of the portable computer 102 such that the USB device 124 cannot be detached from the portable computer without damaging at least a portion of the device's enclosure 609.

Figure 3:
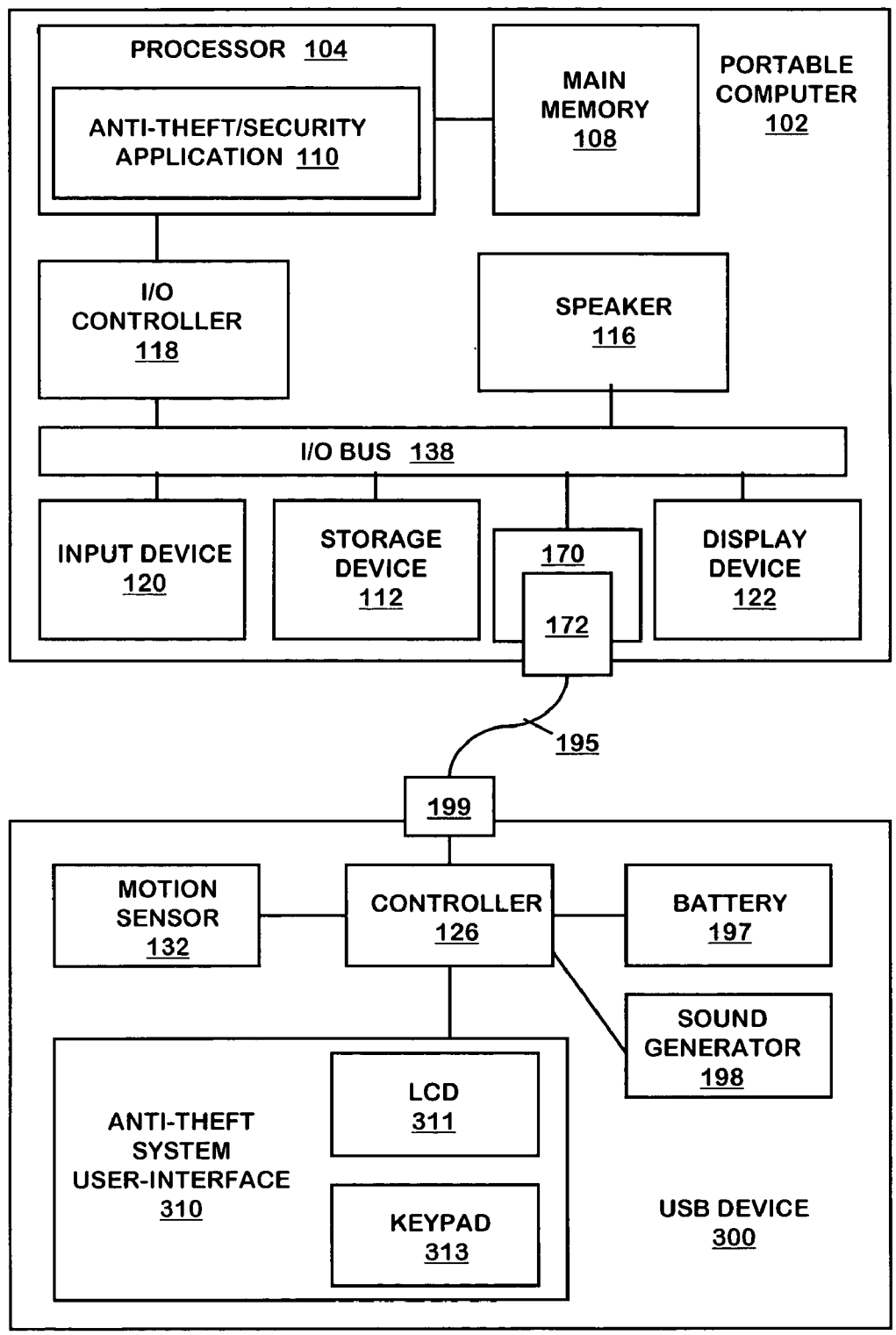
FIG. 3 shows a block diagram of an anti-theft/security system for a computer according to yet another embodiment of the invention.

In the illustrated embodiment shown in FIG. 6A, the USB device 124 includes a sensor 603 that scans fingerprints, which may be used to activate and deactivate the anti-theft/security system. Alternatively or in addition to the fingerprint scan sensor 603, the USB device 124 may include a wireless receiver 190 which may be used in conjunction with a wireless remote control 134 to conveniently activate and deactivate the anti-theft/security system merely by pressing a button. Other suitable types of user interface may also be used for enabling and disabling the alarm sub-system. As shown in FIG. 3, a user-interface 310 including a numeric keypad 313 and a small LCD display 311 may be provided on the enclosure of the USB device 300. In this embodiment, the alarm sub-system can be enabled and/or disabled by enter a predefined code using the numeric keypad 313 provided on the USB device 300. Referring back to FIG. 6A, an LED 601 is provided on the enclosure 609 of the USB device 124 in one embodiment, which may be used to indicate to others and to the user whether the anti-theft/security system is currently activated or deactivated.

Figure 6B:
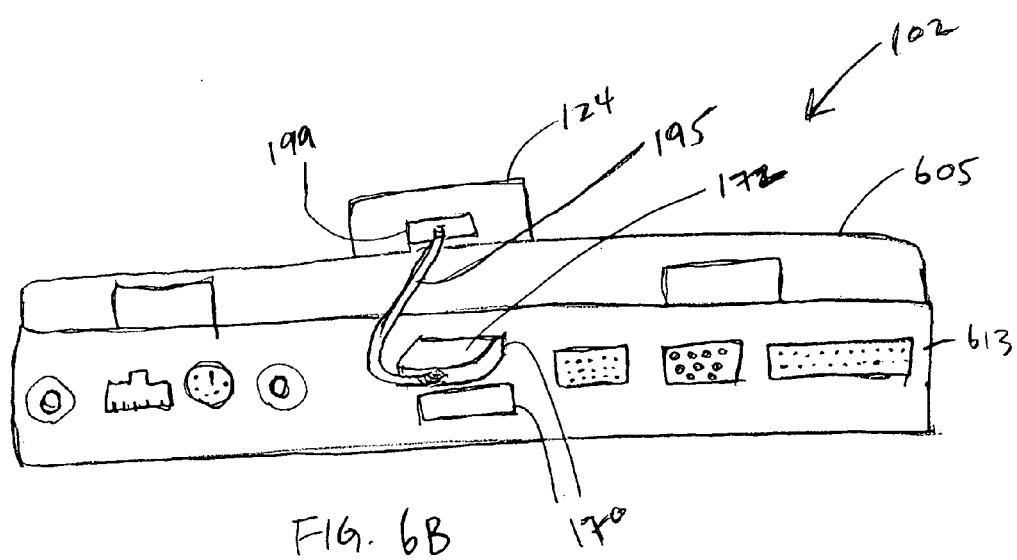
FIG. 6B shows a rear elevational view of an anti-theft device attached to a top cover of a portable computer according to one embodiment of the invention.

FIG. 6B shows a rear elevational view of an anti-theft device attached to a top cover of a portable computer according to one embodiment of the invention. In the illustrated embodiment shown in FIG. 6B, the USB port connector 172 is connected to a port 199 of the USB device 124 via a flexible cable 195. In one embodiment, the flexible cable 195 is removable connected to the port 199 of the USB device 124. It should also be noted that the USB port connector 172 removable connects with a USB port 170 of the portable computer 102 in one embodiment. If desired, the flexible cable 195 may be configured such that one end of the flexible cable 195 is non-removably connected to the port 199 and the other end of the flexible cable 195 cannot be easily disconnected by others once it has been properly connected to the USB port connector 172.

Referring back to FIG. 1, the anti-theft/security system also includes an alarm sub-system to cause an audible alarm to be generated if a movement of the USB device 124 is detected while the alarm sub-system is enabled. In one embodiment, the alarm sub-system is implemented within the computer. In one embodiment, the alarm sub-system comprises an anti-theft/security application 110 executed within the portable computer 102, which causes the speaker to sound an audible alarm when certain conditions are satisfied. More specifically, the anti-theft/security application 110 running in the portable computer is in communication with the USB device 124 and uses a signal generated within the USB device 124 to determine if an audible alarm needs to be activated and/or deactivated. In one embodiment, the anti-theft/security application 110 running in the portable computer 102 is configured to cause the speaker 116 to produce an audible alarm in response to the motion signal generated by the motion sensor 132 while the alarm sub-system is enabled.

In one embodiment, an alarm sub-system is implemented within the USB device 124 in addition to or alternatively to the alarm sub-system implemented within the portable computer 102. The alarm sub-system comprises, among other things, a sound generator 198 and a power source 197 (e.g., rechargeable battery) contained within the enclosure of the USB device 124. The controller 126 of the USB device 124 is configured to cause the sound generator 198 to sound an audible alarm based on a signal generated by the motion sensor 132 while the alarm sub-system is enabled.

In one embodiment, the anti-theft/security system is capable of determining if the USB device 124 has been unplugged or disconnected from the portable computer 102. This may be accomplished in a number of different ways. The unplugging of the USB device 124 may be recognized by the anti-theft/security application 110 when a communication with the USB device cannot be established. Alternatively or in addition to, the unplugging of the USB device 124 may be recognized by the operating system running in the computer and this information may be communicated from the operating system to the anti-theft/security application 110. In one embodiment, the anti-theft/security system is configured to cause the audible alarm to be generated if it detects that the USB device 124 has been unplugged or disconnected from the portable computer 102 while the alarm sub-system is enabled. The USB device 124 may become disconnected when someone cuts the flexible cord 195 connecting the USB device 124 to the USB port 170 in an attempt to disable the alarm system. In one embodiment, the anti-theft/security system is configured to determine if the USB device 124 has been disconnected from the USB port 170 and will cause the audible alarm to be generated if the flexible cord 195 becomes disconnected.

In one embodiment, the anti-theft/security system includes a wireless remote control (e.g., wireless device 134 shown in FIG. 1) to allow a user to enable and disable the alarm sub-system. The wireless device 134 includes a wireless transmitter 192 for transmitting wireless signals to the USB device 124. The anti-theft/security system is configured such that the alarm sub-system can be enabled and/or disabled by using the switches 194 provided on the wireless device 134. The wireless signal transmitted by the wireless device 134 is received by the wireless receiver 190 of the USB device 124 and is processed by the controller 126 located within the USB device. The controller 126 of the USB device 124 is in communication with the anti-theft/security application 110 and is configured to enable and disable the alarm sub-system implemented by the computer 102 and/or alarm sub-system implemented by the USB device 124, based on a wireless signal received by the wireless receiver 190.

In one embodiment, the anti-theft/security application 110 includes security functions in addition to the anti-theft functions described above. The security functions of the application 110 is configured to detect when someone trying to access the computer. The security functions of the application 110 may be enabled and disabled in conjunction with enabling and disabling of the anti-theft functions. In use, when someone tries to access the computer while the security functions have bee enabled, the application 110 executed within the computer will generate an audible alarm or a warning (either visually or audibly) to indicate that the security functions are turned on and that nobody can access the computer unless the alarm sub-system is properly turned off. Accordingly, the application 110 will prevent any person from access a portion or entire portion of the storage device 112 of the computer when the security sub-system is turned on. This provides a simple way to turn on and off a security system implemented by the computer by using the USB device 124 and a wireless remote control device 134.

Figure 2:
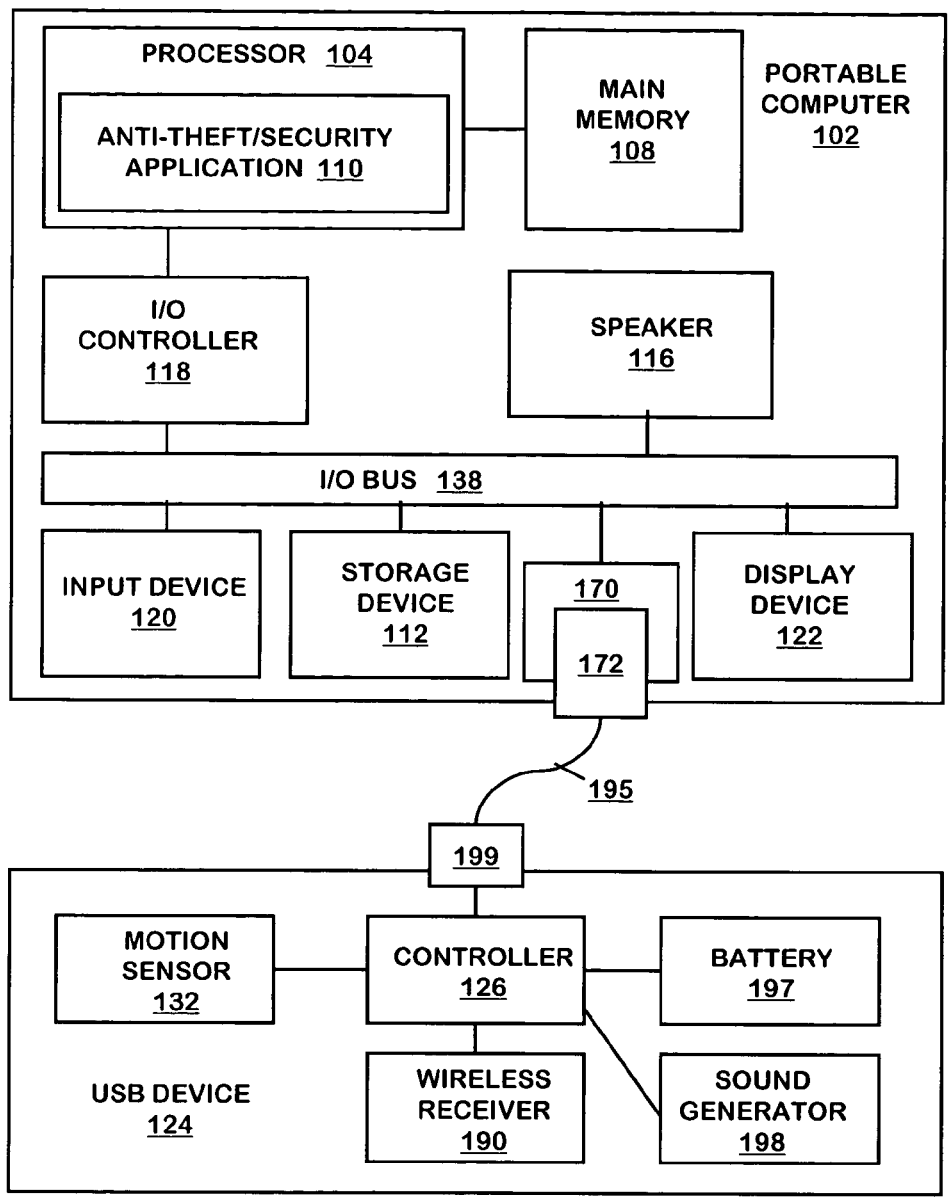
FIG. 2 shows a block diagram of an anti-theft/security system for a computer according to another embodiment of the invention.
Figure 2:
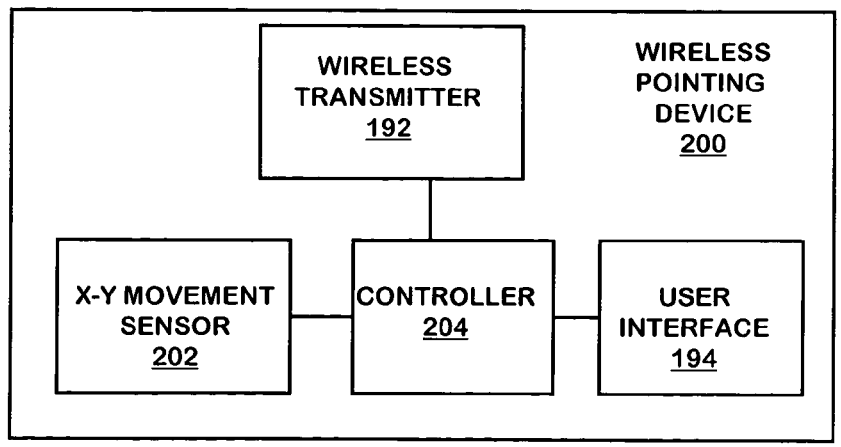

In an embodiment shown in FIG. 2, the wireless device to enable a user to enable and disable the alarm sub-system is embodied in a form of a wireless pointing device 200. The term "pointing device" is used to describe a computer input device that may be used, for example, for positioning a cursor on a computer video display. In one embodiment, the wireless pointing device 200 includes an enclosure that lies flat on a support surface and one or more user-actuated switches or buttons 194 located externally of the enclosure, a X-Y movement sensor 202, a controller 204 and a wireless transmitter 192 to enable wireless communication with the USB receiver device 124. In use, the controller 204, located within the enclosure, convert the X and Y movement of the pointing device 200 and switch information into digital information, which is supplied to the portable computer 102. Software running in the portable computer 102 uses the motion and switch information to perform various functions, for example, repositioning the cursor on the computer display screen 122. In this embodiment, the user interface 194 provided on the wireless pointing device 200 may be used by a user to enable and disable the alarm-subsystem (the alarm subsystem implemented by the portable computer 102 and/or the alarm subsystem implemented by the USB device 124. In one embodiment, the user interface 194 provided on the pointing device includes a numeric keypad and a small LCD display provided on the enclosure of the pointing device. In this regard, the alarm sub-system can be enabled and/or disabled by enter a predefined code using the numeric keypad provided on the pointing device. In another embodiment, the alarm sub-system may be enabled or disabled by using the conventional pointing device buttons provided on the pointing device.

Figure 4:
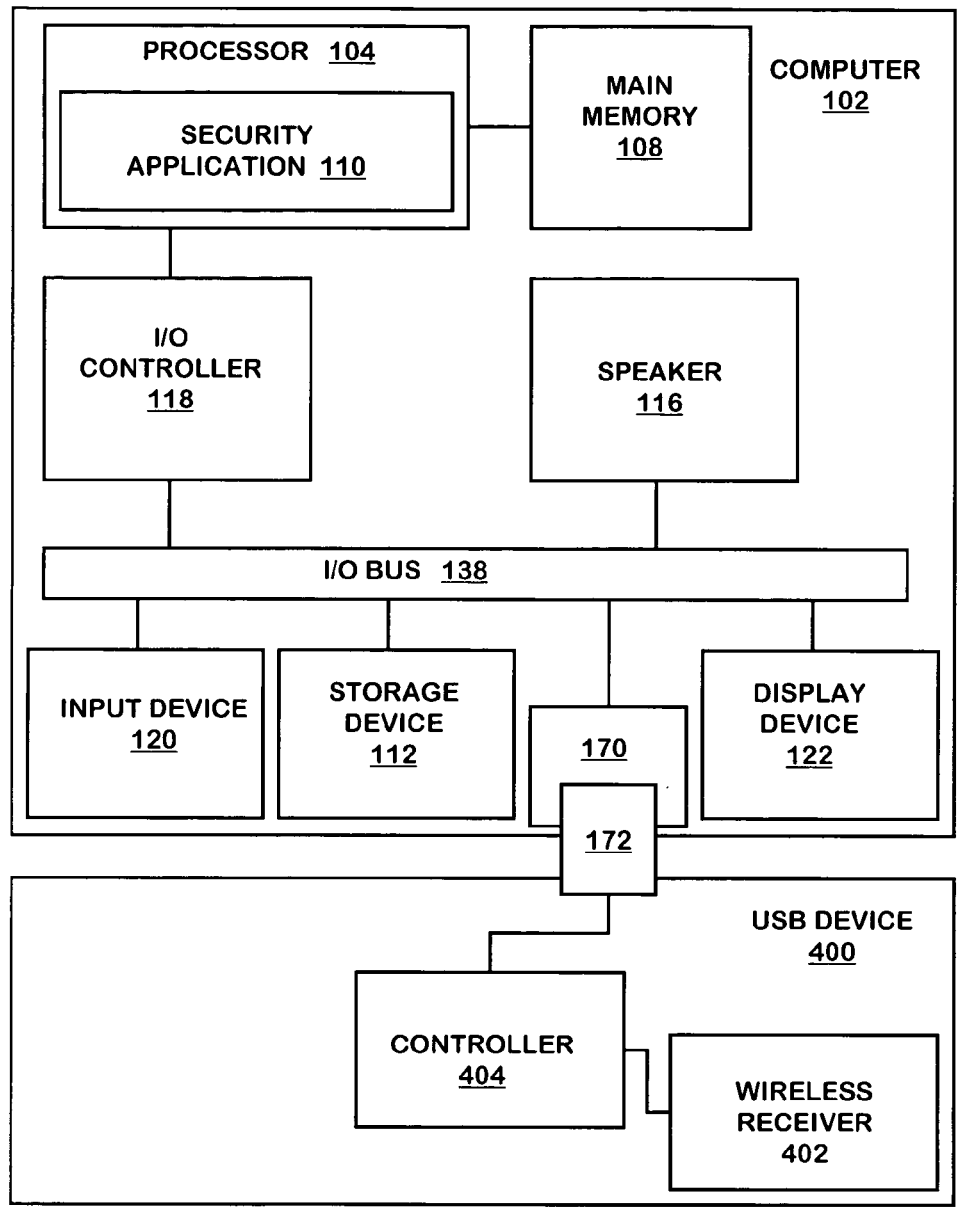
FIG. 4 shows a block diagram of a security system for a computer according to one embodiment of the invention.
Figure 4:
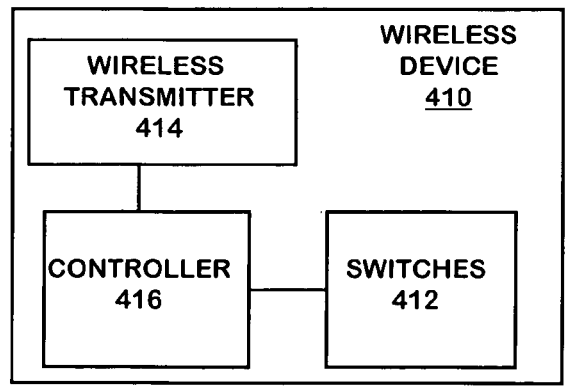

FIG. 4 shows a block diagram of a security system for a computer (e.g., non-portable computer such as desktop computer) according to one embodiment of the invention. In this embodiment, the security application 110 is capable of detecting when someone tries to access the computer. A security sub-system of the computer may be enabled and disabled using the wireless device 410 and the USB device 400 coupled to the computer. In use, when someone tries to access the computer while the security sub-system is enabled, the security application 110 executed within the computer will generate an audible alarm or a warning (either visually or audibly) to indicate that the security sub-system is turned on and that nobody can access the computer unless the alarm sub-system is properly turned off. Accordingly, the security application 110 will prevent any person from access a portion or entire portion of the storage device 112 of the computer when the security sub-system is turned on. This embodiment provide a simple way to turn on and off a security system implemented by the computer by using the USB wireless receiver device 400 and a wireless remote control device 410.

Figure 5:
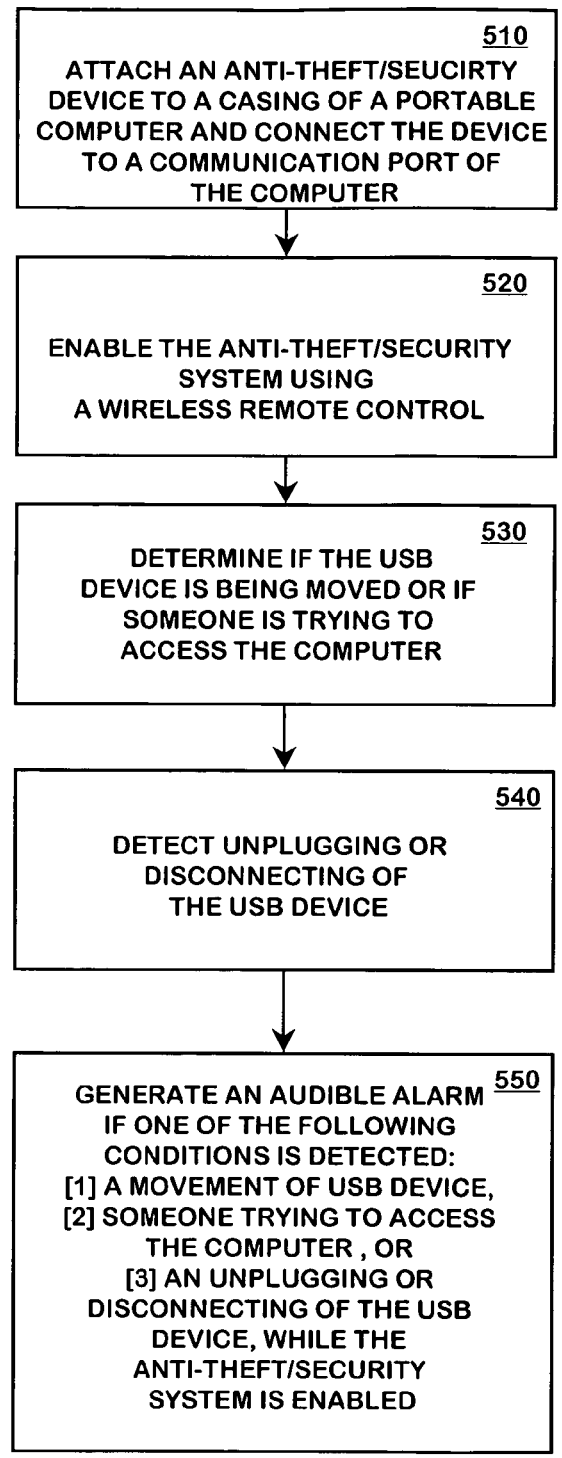
FIG. 5 shows a flowchart diagram illustrating a method of preventing an unauthorized person from moving or stealing a portable computer according to one embodiment of the invention.

FIG. 5 shows a flowchart diagram illustrating a method of preventing unauthorized taking or using of a portable computer according to one embodiment of the invention. In block 510, a user sets up an anti-theft/security system by attaching an anti-theft/security device (e.g., USB device 124) to a casing of a portable computer and connecting a flexible cable between a portion of the USB device and a USB port of the computer. There are a number of ways to non-removably attach the anti-theft/security device to a portable. For example, an adhesive material may be used to permanently attach a portion of the enclosure of the anti-theft/security device to a top cover of the portable computer. When the user has to leave the portable computer unattended, the user first closes the top cover of the computer and interacts with a user interface to enable the anti-theft/security system in block 520. In one embodiment, the anti-theft/security system is enabled by using a wireless transmitter device (e.g., wireless remote control) to communicate with a wireless receiver incorporated within the USB device.

In one embodiment, the anti-theft/security system causes an audible sound to be generated (by the portable computer or the USB device, or both) based on a signal generated by a motion sensor contained within the USB device. In one embodiment, the anti-theft/security system is capable of detecting [1] a movement of the USB device, [2] when someone tries to open the top cover of the computer, [3] when someone tries to access the computer and [4] detecting unplugging or disconnecting of the USB device. Accordingly, in block 530, the anti-theft/security system determines if the USB device is being moved (due to opening of the top cover of the computer or due to taking of the computer) or if someone is trying to access the computer. Additionally, in block 540, the anti-theft/security system determines if the USB device has been unplugged or disconnected from the portable computer. Then in block 550, the anti-theft/security system generates an audible alarm or a warning [1] if the movement of the USB device is detected, [2] if someone tries to access the computer, or [3] if the unplugging or disconnecting of the USB device is detected, while the anti-theft/security system is enabled. When the user is ready to use the portable computer again, the user may disable the anti-theft-security system via the wireless transmitter device.

In one embodiment, the anti-theft/security system prevents turning off or rebooting of the computer when the anti-theft/security system is enabled. In one embodiment, the anti-theft/security system prevents unauthorized use of the computer (e.g., prevents others from accessing the hard drive and/or prevents others from starting or booting the computer) if the computer is taken while the anti-theft/security system is enabled and appropriate steps have not been taken to properly disable the anti/theft/security system (e.g., using the wireless remote control or entering a predefined code).

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
   a motion detection device having an enclosure to contain a motion sensor; and
   a connector to couple the motion detection device to an external port of a portable computer, the motion detection device capable of receiving electrical power from the portable computer via the connector, wherein the connector enables the enclosure of the motion detection device to establish physical contact with a casing of the portable computer so that the enclosure of the motion detection device is capable of non-detachably attaching to the casing of the portable computer while the motion detection device is electrically coupled to the external port of the portable computer.

2. The system of claim 1, wherein the enclosure of the motion detection device is permanently attached to an external surface of the casing of the portable computer using an adhesive material.

3. The system of claim 1, wherein the portable computer is operable to generate an audible sound based on a signal generated by the motion detection device.

4. The system of claim 1, wherein the motion detection device is operable to generate an audible sound based on a signal generated by the motion sensor.

5. An apparatus comprising:
   an enclosure;
   a wireless receiver contained in the enclosure to receive wireless signals;
   a motion sensor contained in the enclosure to enable detection of movement of the enclosure;
   a controller contained in the enclosure and coupled to the wireless receiver and the motion sensor, the controller to generate a signal indicating that the enclosure is being moved; and
   a connector to couple between the controller and an external port of a portable computer, wherein the connector enables the enclosure to establish physical contact with a casing of the portable computer so that the enclosure of the motion detection device is capable of non-detachably attaching to the casing of the portable computer while the controller is electrically coupled to the external port of the portable computer.

6. The apparatus of claim 5, wherein the enclosure is permanently attached to an external surface of the casing of the portable computer using an adhesive material.

7. The apparatus of claim 5, wherein the portable computer is operable to generate an audible sound based on the signal generated by the controller.

8. The apparatus of claim 5, further comprising:
   a sound generator contained in the enclosure, the sound generator operable to generate an audible sound based on a signal generated by the motion sensor.

9. A system comprising:
   a motion detection device having a motion sensor, the motion detection device capable of connecting to an external port of a portable computer, the motion detection device including a wireless receiver capable of receiving wireless signals;
   a remote wireless transmitter unit to transmit wireless signals to the motion detection device to enable and disable an alarm function; and
   a connector to enable an enclosure of the motion detection device to establish physical contact with a casing of the portable computer so that the enclosure of the motion detection device is capable of non-detachably attaching to the casing of the portable computer while the motion detection device is electrically coupled to the external port of the portable computer.

10. The system of claim 9, wherein the enclosure of the motion detection device is permanently attached to an external surface of the casing of the portable computer using an adhesive material.

11. The system of claim 9, wherein the portable computer is operable to generate an audible sound based on a signal generated by the motion detection device.

12. The system of claim 9, wherein the motion detection device is operable to generate an audible sound based on a signal generated by the motion sensor.

13. A method comprising:
   non-detachably attaching a motion detection device having a motion sensor to a casing of a portable computer via a connector;
   using the connector to couple the motion detection device to an external port of the portable computer;
   supplying electrical power from the portable computer to the motion detection device via the connector;
   causing an audible sound to be generated based on a signal generated by the motion detection device.

14. The method of claim 13, wherein the connector comprises a flexible cable.

15. The method of claim 13, wherein non-detachably attaching the motion detection device comprises using an adhesive to permanently attach a portion of the enclosure of the motion detection device to an external surface of the casing of the portable computer.

16. The method of claim 13, further comprising:

enabling an alarm function executable by the portable computer, wherein the audible sound is generated by the portable computer based on a signal generated by the motion detection device while the alarm function is enabled.

17. The method of claim 13, further comprising:

enabling an alarm function executable by the motion detection device, wherein the audible sound is generated by the motion detection device based on a signal generated by the motion sensor while the alarm function is enabled.

* * * * *